(No Model.)
J. H. MONSEY.
COFFEE OR TEA BOILER.
No. 436,485. Patented Sept. 16, 1890.
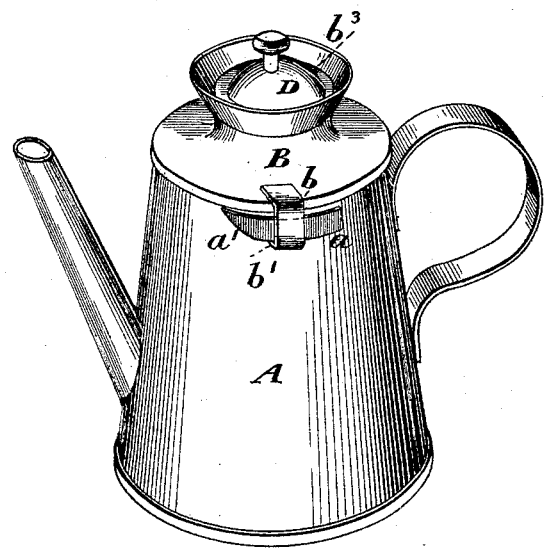
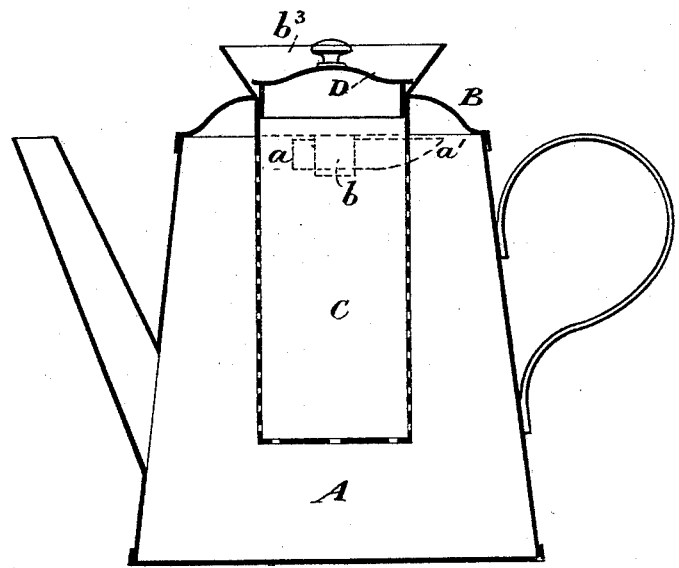
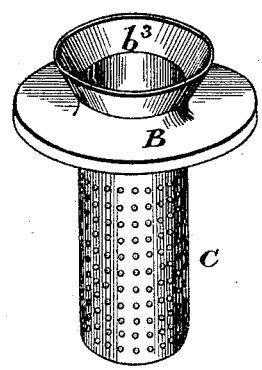
Witnesses.
A. Ruppert
G. B. Towles
Inventor.
John H. Monsey
Per
Thomas P. Simpson
Atty

UNITED STATES PATENT OFFICE.

JOHN H. MONSEY, OF WALKER'S, OHIO, ASSIGNOR OF ONE-HALF TO JOHN W. BAXTER.

COFEE OR TEA BOILER.

SPECIFICATION forming part of Letters Patent No. 436,485, dated September 16, 1890.

Application filed February 13, 1890. Serial No. 340,332. (No model.)

*To all whom it may concern:*

Be it known that I, JOHN H. MONSEY, a citizen of the United States, residing at Walker's, in the county of Columbiana and State of Ohio, have invented certain new and useful Improvements in Coffee and Tea Boilers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to construct the cover and strainer of tea or coffee boilers so that they shall be easily and tightly fastened, quickly and conveniently removable to empty the spent coffee or tea, and provided with a safety-valve at the top.

Figure 1 of the drawings is an elevation in perspective showing the cover locked to the body of the boiler; Fig. 2, a vertical section of the same, and Fig. 3 a detail perspective view of the cover and strainer.

In the drawings, A represents the body of a coffee-boiler, B the cover, and C the strainer, the parts B, C, and seat $b^3$ being soldered together. The body A is provided on opposite sides with the cams $a\ a$, one inclining on its under side to the rear and the other to the front of said body. On the top of the cover is a concave seat $b^3$, in which is supported the safety-valve D, with a finger-piece by which it may be lifted in order to put into the strainer the desired quantity of coffee or that the spent coffee may be thrown out. It is very quickly washed and easily kept clean. It is not necessary to remove the cover with the strainer in order to pour in the ground coffee, but simply to take off the valve D, put in the coffee, and pour in the boiling water.

Having thus described all that is necessary to a full understanding of my invention, what I claim as new, and desire to protect by Letters Patent, is—

The coffee-pot cover B, constructed with an upwardly-flared lid or valve-seat $b^3$, and the subjacent strainer C, soldered thereto, as shown and described.

In testimony whereof I affix my signature in presence of two witnesses.

JOHN H. MONSEY.

Witnesses:
 DAVID MANNIST,
 JAMES W. CLARK.